United States Patent
Suddaby et al.

(10) Patent No.: US 7,850,188 B2
(45) Date of Patent: Dec. 14, 2010

(54) APPARATUS FOR CONNECTING TOGETHER TWO OBJECTS AND CHAIR INCORPORATING THE SAME

(75) Inventors: Thomas Paul Suddaby, Newent (GB); Sean Patrick Nelson, Wrexham (GB)

(73) Assignee: Specmat Limited, Herefordshire (GB)

( * ) Notice: Subject to any disclaimer, the term of this patent is extended or adjusted under 35 U.S.C. 154(b) by 334 days.

(21) Appl. No.: 11/875,704

(22) Filed: Oct. 19, 2007

(65) Prior Publication Data

US 2008/0111339 A1 May 15, 2008

(30) Foreign Application Priority Data

Nov. 15, 2006 (GB) .................. 0622770.6
Jul. 18, 2007 (GB) .................. 0713992.6

(51) Int. Cl.
*A61G 5/10* (2006.01)
(52) U.S. Cl. .................. 280/304.1
(58) Field of Classification Search .................. 16/253; 280/304.1; 297/271.1, 423.34, 423.36
See application file for complete search history.

(56) References Cited

U.S. PATENT DOCUMENTS

| | | | |
|---|---|---|---|
| 4,073,537 A | 2/1978 | Hammersburg | |
| 4,989,890 A | 2/1991 | Lockard et al. | |
| 5,092,552 A * | 3/1992 | Dayton et al. | 248/280.11 |
| 5,208,409 A * | 5/1993 | Roulet | 84/278 |
| 6,499,756 B2 * | 12/2002 | Amirola | 280/304.1 |
| 6,543,854 B1 * | 4/2003 | Finch | 297/423.37 |
| 6,877,191 B2 * | 4/2005 | Logan et al. | 24/279 |
| 7,207,630 B1 * | 4/2007 | Reynolds | 297/397 |
| 7,367,578 B2 * | 5/2008 | Jansen | 280/304.1 |
| 2006/0082098 A1 * | 4/2006 | Harris | 280/304.1 |
| 2006/0186295 A1 | 8/2006 | Dittmer et al. | |
| 2006/0272456 A1 * | 12/2006 | Hsien | 81/119 |
| 2009/0245925 A1 * | 10/2009 | Suddaby et al. | 403/14 |

FOREIGN PATENT DOCUMENTS

JP 2006026140 2/2006

* cited by examiner

*Primary Examiner*—Tony H. Winner
(74) *Attorney, Agent, or Firm*—Townsend and Townsend and Crew LLP

(57) ABSTRACT

Apparatus for connecting together two objects comprises:
a body for attachment to a first object and having a concave surface and a corresponding convex surface;
a clamp for attachment to a second object and having a first jaw and a second jaw moveable relative to the first jaw, the first and second jaws being configured to engage respectively the concave and convex surfaces of the body when applying a clamping force thereto,
wherein at least one jaw comprises at least one tooth configured to bite into the body as the clamping force is applied, thereby resisting movement between the body and the clamp.

A chair, in particular a wheelchair for disabled persons, has one or more rests mounted on apparatus as detailed above.

13 Claims, 7 Drawing Sheets

APPARATUS FOR CONNECTING TOGETHER TWO OBJECTS AND CHAIR INCORPORATING THE SAME

TECHNICAL FIELD

The present invention relates to lockable joints for connecting two objects, particularly but not exclusively lockable ball joints, and a chair for a disabled person incorporating such a lockable joint.

BACKGROUND ART

Known ball joints utilise a ball cup and a ball which fits snugly inside. This technology can be found on a lot of components from camera tripods to hip replacements.

WO94/26556 discloses a joint in an automotive mirror assembly having a hand set adjustment mechanism and comprising a partially spherical base with a post centrally extending therefrom for compressibly mounting a pivot cup thereupon. The post extends between the inside of the base and the backside of the mirror casing.

It is an object of the present invention to provide an improved joint.

DISCLOSURE OF INVENTION

According to the present invention, there is provided apparatus for connecting together two objects, comprising: a body for attachment to a first object and having a concave surface and a corresponding convex surface; a clamp for attachment to a second object and having a first jaw and a second jaw moveable relative to the first jaw, the first and second jaws being configured to engage respectively the concave and convex surfaces of the body when applying a clamping force thereto; wherein at least one jaw comprises at least one tooth configured to bite into the body as the clamping force is applied, thereby resisting movement between the body and the clamp.

By virtue of the at least one tooth configured to bite into a respective clampable surface, the joint is better able to maintain its position when subject to sustained loads and impact. In the context of a wheelchair for a disabled person, such a joint may allow a footplate to be positioned in one of many directions and, once locked, maintain that position even when subject to severe loads and impact from a user, for example when a child extends or spasms.

The concave and convex surfaces may each have a substantially constant radius of curvature and may each be partially spherical.

The clamp may further comprise a rod coupling the first and second jaws together, the rod extending through an aperture in the body. The rod may have a thread engageable with a corresponding thread in at least one jaw. To allow relative motion of the joint members when not locked, the aperature is preferably wider than the rod. Advantageously, the hole is elongate, thereby permitting greater rotation of the joint about one axis than about another axis perpendicular thereto. The elongation may be chosen to permit a maximum rotation of approximately 45 degrees about one axis and approximately 10 degrees about an axis perpendicular thereto.

The first jaw may be disc-shaped, while the second jaw may be annular. The disc may be configured to have such elasticity as to allow the joint to stay locked even if the clamp actuator slackens.

The at least one tooth may be located on the periphery of said first and/or second jaw. A plurality of teeth may extend along the entire perimeter of the first and/or second jaw. A tooth may be of hardness greater than the hardness of the respective clampable surface. Jaw and/or the clampable surface may be made of plastic.

The present invention also provides a chair, in particular a wheelchair, comprising a chassis, a rest and apparatus connecting the rest to the chassis, the apparatus comprising: a body attached to one of the chassis and the rest and having a concave surface and a corresponding convex surface; a clamp attached the other of the chassis and the rest and having a first jaw and a second jaw moveable relative to the first jaw, the first and second jaws being configured to engage respectively the concave and convex surfaces of the body when applying a clamping force thereto, wherein at least one jaw comprises at least one tooth configured to bite into the body as the clamping force is applied, thereby resisting movement between the rest and the chassis.

The rest may be selected from the group comprising a footrest, thigh lateral support and a headrest. The rest and apparatus may be configured to be relatively translatable in at least one linear direction. Advantageously, one of the rest and apparatus comprises at least one slot, while the other of the rest and apparatus comprises a respective fastener engaging said slot. The clamp may be integrally formed with a bracket for attachment to the frame or chassis of the chair.

BRIEF DESCRIPTION OF DRAWINGS

An embodiment of the invention will now be described by way of example with reference to the accompanying drawings, in which.

DETAILED DESCRIPTION OF SPECIFIC EMBODIMENTS

Figure 1:
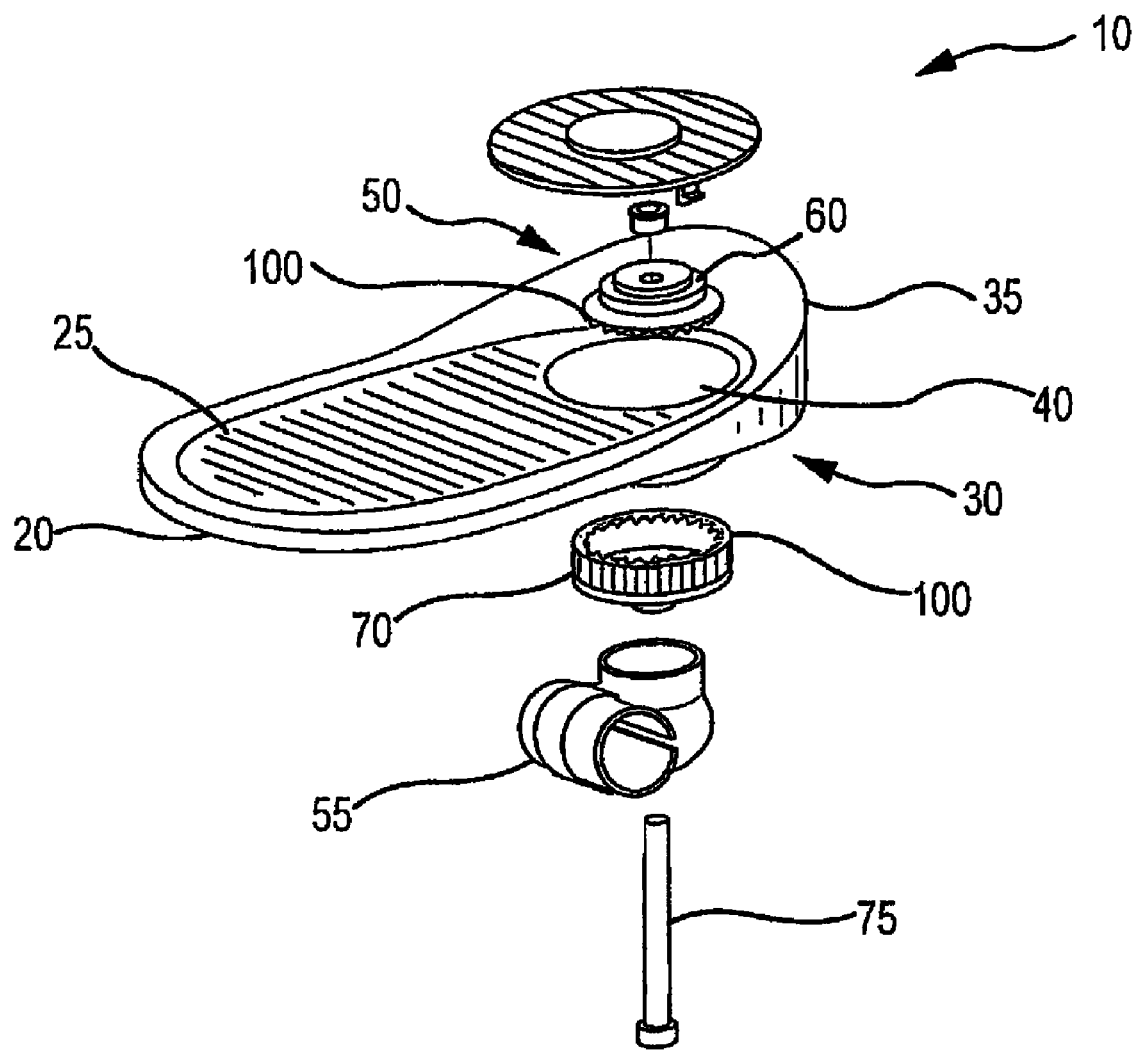
FIG. 1 is a front perspective exploded view of a wheelchair footrest incorporating a lockable joint according to the present invention.

Referring to FIG. 1, a wheelchair footrest assembly 10 comprises an elongate rest member 20 having a rest surface 25 and provided at one end with a lockable joint 30.

Joint 30 comprises a body 35 integral with the rest 20 and having, as its upper surface, a concave surface 40. Surface 40 has a substantially constant radius of curvature about a point A resulting in a surface that is partially spherical. A constant radius about an axis normal to the page and passing through point A, or an axis as indicated by dashed line B, will of course result in a surface that is partially cylindrical.

Figure 2:
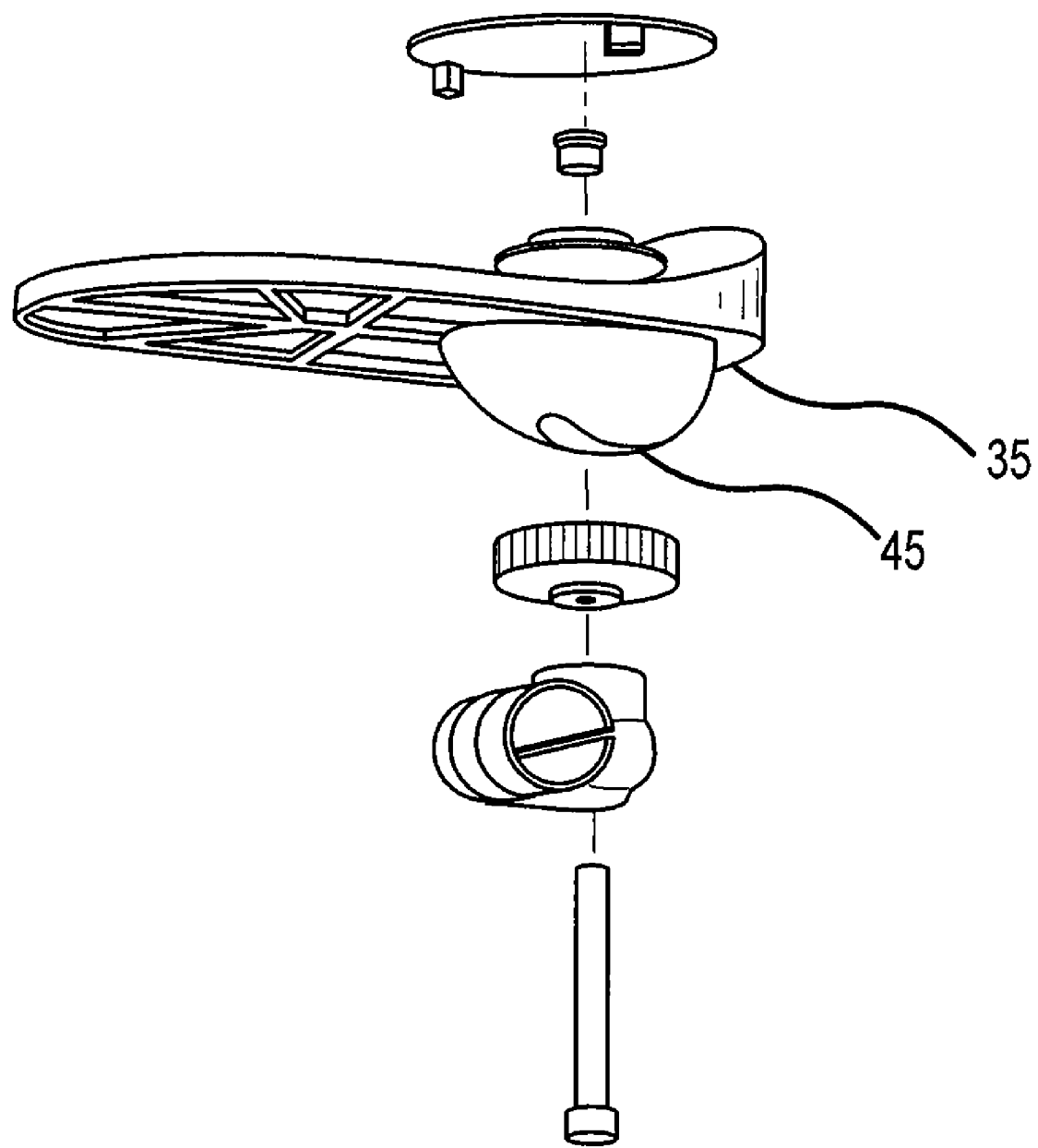
FIG. 2 is a perspective exploded view from below of the wheelchair footrest of FIG. 1.
Figure 3:
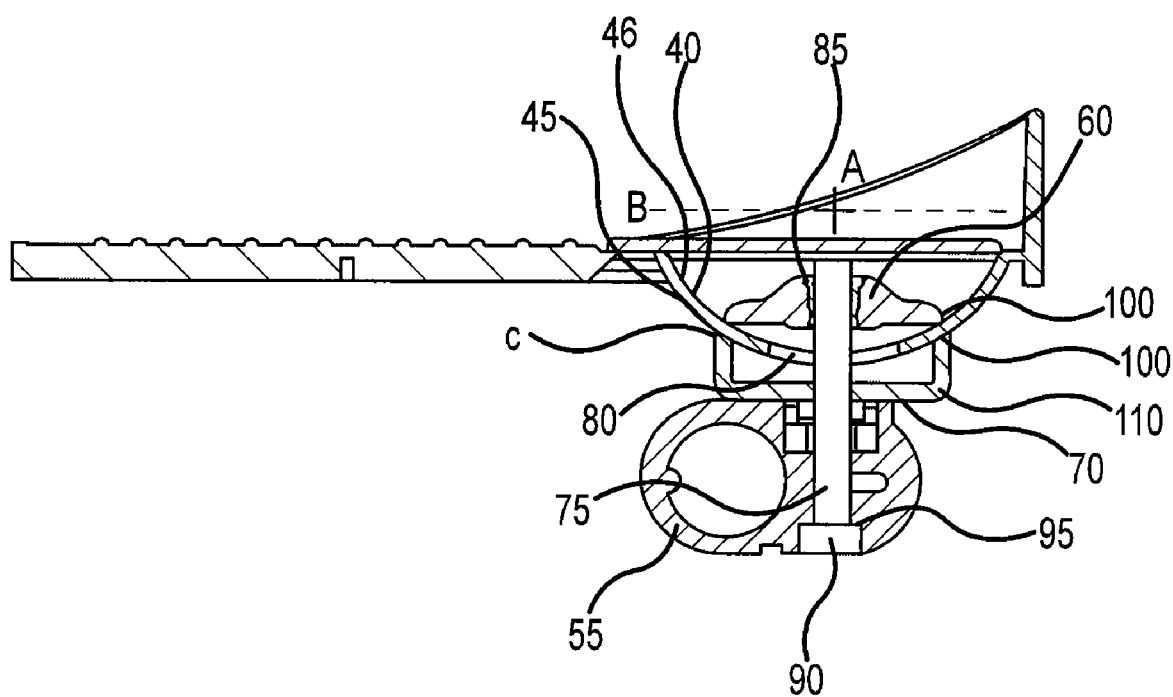
FIG. 3 is a longitudinal sectional view of the footrest of FIG. 1.

As shown in FIG. 2, a corresponding partially spherical convex surface 45 is provided as the lower surface of the body 35. As shown in FIG. 3, the two surfaces 40, 45 define between them a partial spherical shell 46.

Figure 4:
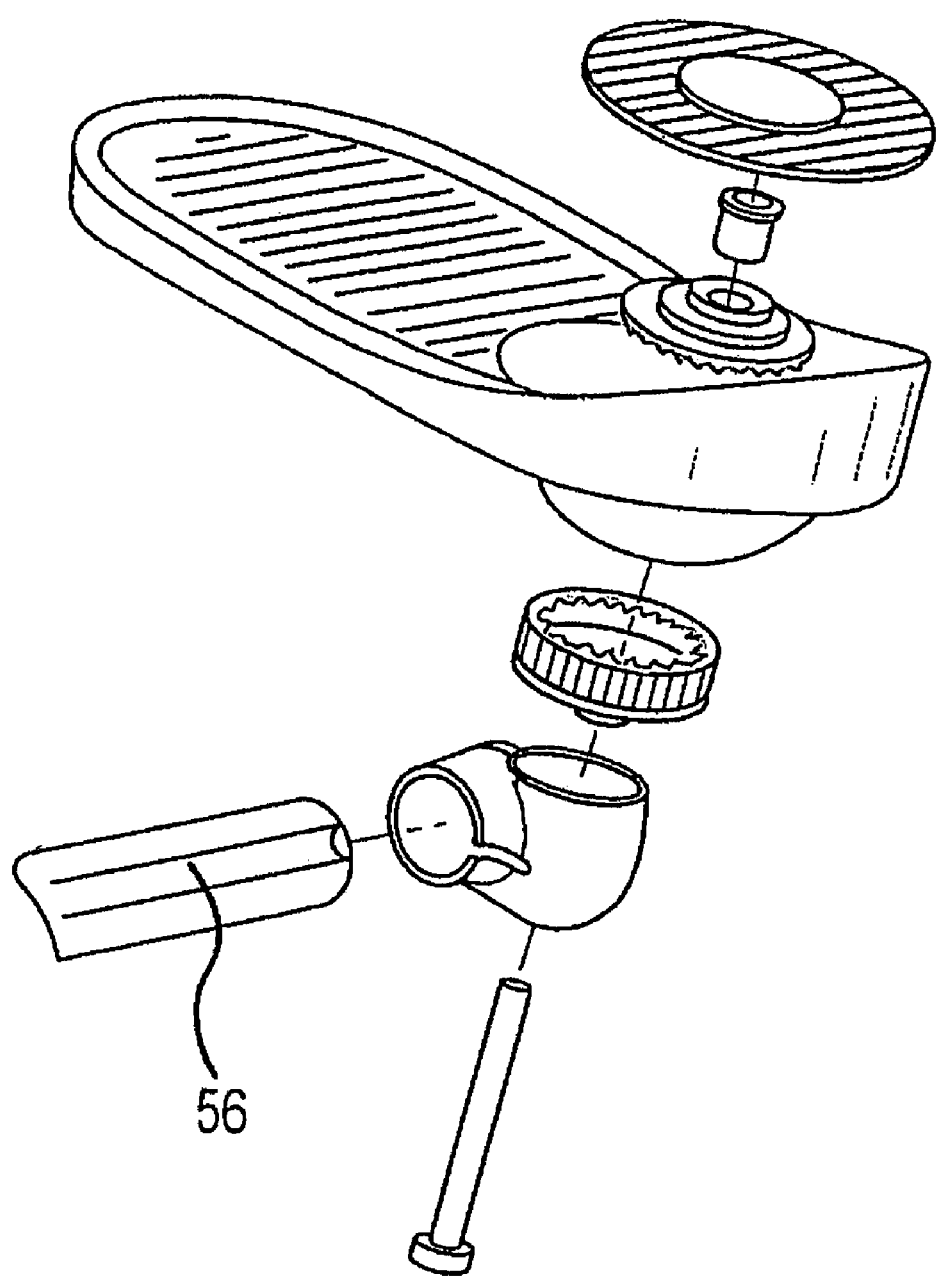
FIG. 4 is a rear perspective exploded view of the wheelchair footrest of FIG. 1.

Referring to FIG. 1, joint 30 also comprises a clamp 50 for attachment to another object, in this case a bracket 55 for attachment to a wheelchair frame or chassis 56 as shown in FIG. 4.

As shown in FIG. 3, clamp 50 is made up of upper and lower clamp jaws 60, 70 connected by a threaded rod, in this case a bolt 75, which passes through an aperture 80 passing through the clampable surfaces 40, 45. The thread of bolt 75 engages a threaded insert 85 in upper jaw 60 while the head 90 of the bolt engages with a shoulder 95 of the lower jaw 70 (which in the case shown is formed in the integral bracket 55).

Aperture 80 is larger than the diameter of the bolt 75 so as to allow relative movement between the body and clamp. As shown in FIGS. 2 and 3, the hole is elongated in the longitudinal direction of the elongate foot rest 20 (axis B in FIG. 3), thereby permitting greater rotation about the horizontal transverse axis of the footrest than about the horizontal longitudinal axis (typically 45 degrees and 10 degrees rotation respectively).

Tightening bolt 75, e.g. by application of a suitable driver to bolt head 90, draws the upper and lower clamp jaws 60, 70 together and into engagement with the respective upper and lower clampable surfaces 40, 45. As particularly evident from FIGS. 1 and 3, jaws 60, 70 are each provided with teeth 100. When clamping forces are applied, these teeth bite into the respective clampable surfaces 40, 45, thereby locking the joint.

As illustrated, both jaws 60, 70 are circular in order to fully engage with the partially spherical clampable surfaces 40, 45. Lower jaw 70 is cup shaped and has teeth 100 along the upper edge of its rim 110 to engage with convex surface 40. The rest 20, integral surfaces 40, 45 and clamp jaws 60, 70 are made of plastic, with the clamp jaws advantageously being made of a much harder grade of plastic than the surfaces so as to better penetrate the surfaces 40, 45 and thereby provide improved locking.

In addition, the more pressure/impact that is placed on the rest 20, the deeper the teeth penetrate the lower surface 45. The teeth act as an anchor: when the clamps are tight, the front portion C of the lower jaw becomes the new pivot. This is in contrast to the rotational movement about axes A and B that is possible when the joint is not clamped. As the footplate works on a ball, this clamping effect works in all directions.

Upper jaw 60 is disc shaped and has teeth 100 along the lower edge of its rim 110 to engage with concave surface 40. Upper clamp 60 is made of a plastic which has the mechanical properties to clamp the footplate but also has a small amount of spring/flex. Such elasticity allows the footplate to stay firm even if the securing bolt slackens slightly.

Footrest 20 is advantageously made of a plastic which can absorb the extension or spasm of an occupant, thus reducing the impact on the joint itself.

Figure 5:
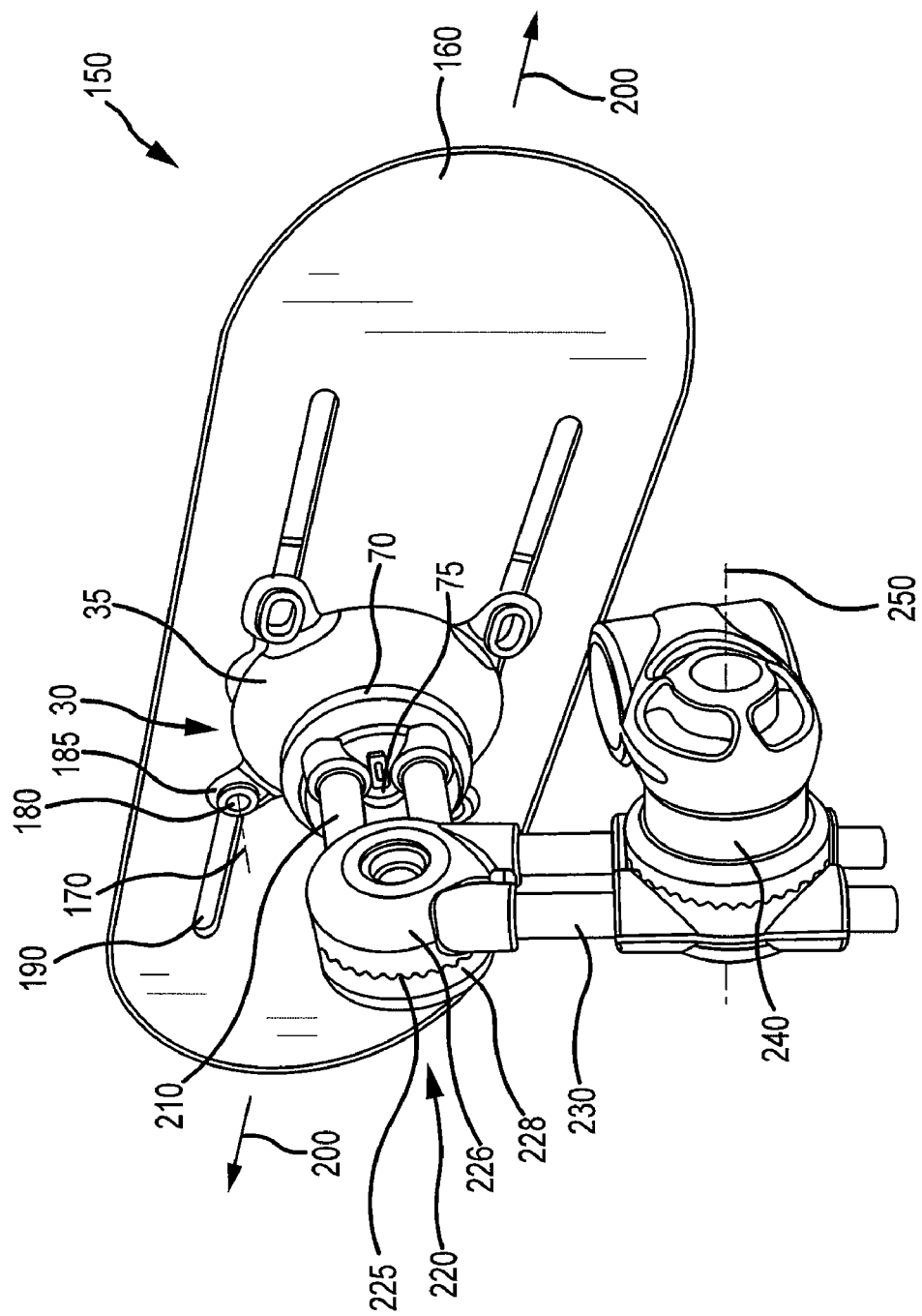
FIG. 5 is a perspective view of a thigh lateral support assembly incorporating the present invention.

FIG. 5 is a perspective view of a thigh lateral support assembly 150 comprising a rest or support member member 160 supported by a lockable joint 30 according to the present invention.

Rather than being integral with the rest 160, the body 35 of the joint is attached to the rest 160 by means of fasteners, e.g. nuts and bolts, indicated by dashed lines 170 and passing through holes 180 in lugs 185 on the body 35 and slots 190 in the rest 160. As regards the clamp, its lower jaw 70 is attached to a bracket 240 for connection to an arm rest (not shown).

Releasing the fasteners 170 allows the rest 160 to be moved in translation in at least one linear direction relative to the joint 130 as indicated by arrows 200. Tightening the fasteners secures the rest in position.

Further flexibility in positioning is provided by a rotatable joint 220 having two halves 226, 228 respectively attached to jaw 70 via bars 210 and to bracket 240 by bars 230. Serrations 225 prevent relative movement of the two halves 226, 228 when drawn together by a bolt (not shown).

Yet further adjustment is enabled by bracket 240 which can be slid along bars 230 as well as being rotated about axis 250. Serrations are again provided to prevent rotation when bracket is pulled together by means of a central bolt (not shown).

Figure 6:
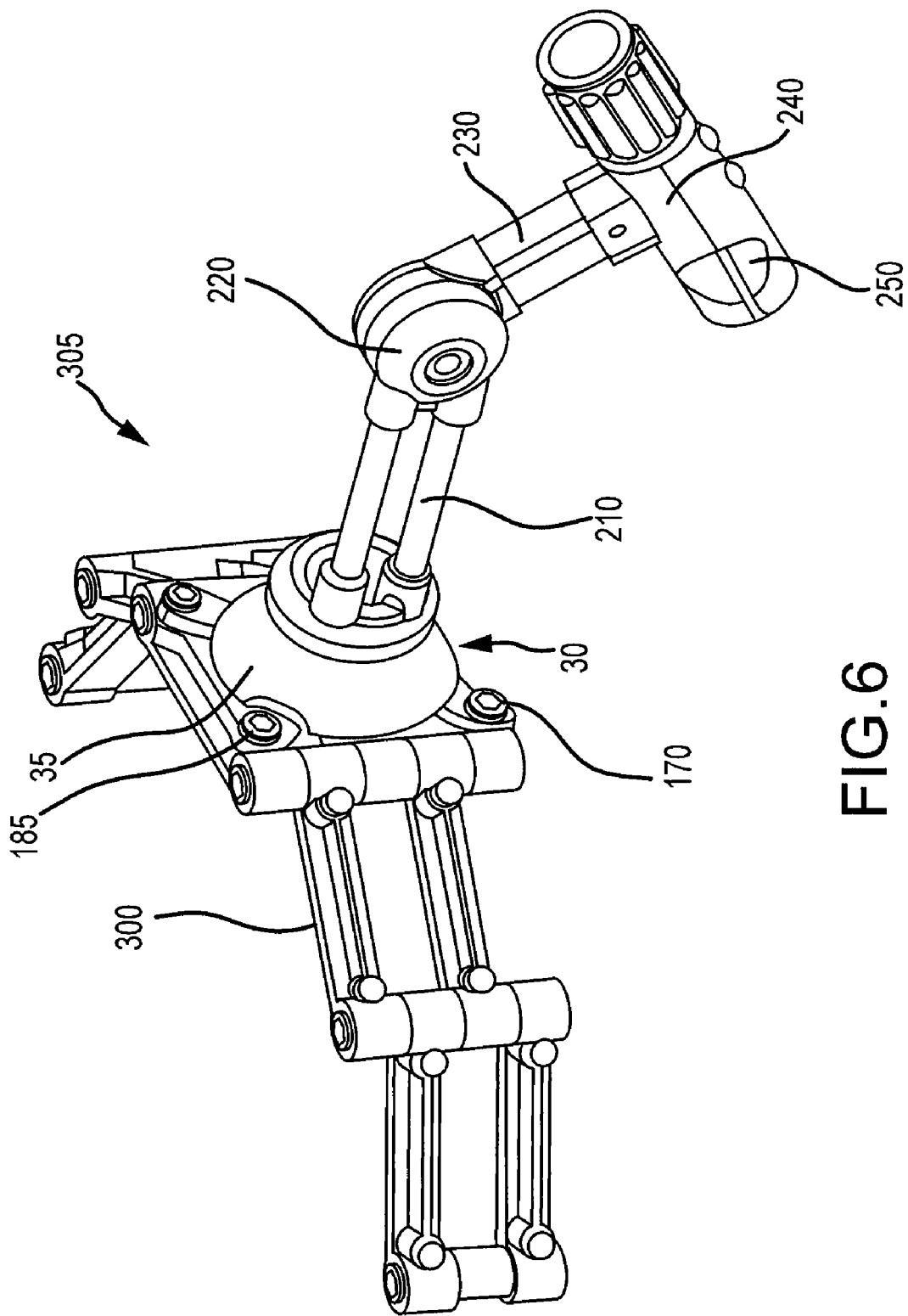
FIG. 6 is a perspective view of a headrest incorporating the present invention.

FIG. 6 illustrates the lockable joint of the present invention when applied to a headrest assembly 305. As in the embodiment of FIG. 5, the body 35 of the joint 30 is attached to the headrest 300 by means of fasteners 170 passing through holes in lugs 185. Joint 30 is also attached via bars 210 to an adjustable joint 220 and thence via bars 230 to a bracket 240 for attachment to the chair frame or chassis at 250.

Figure 7:
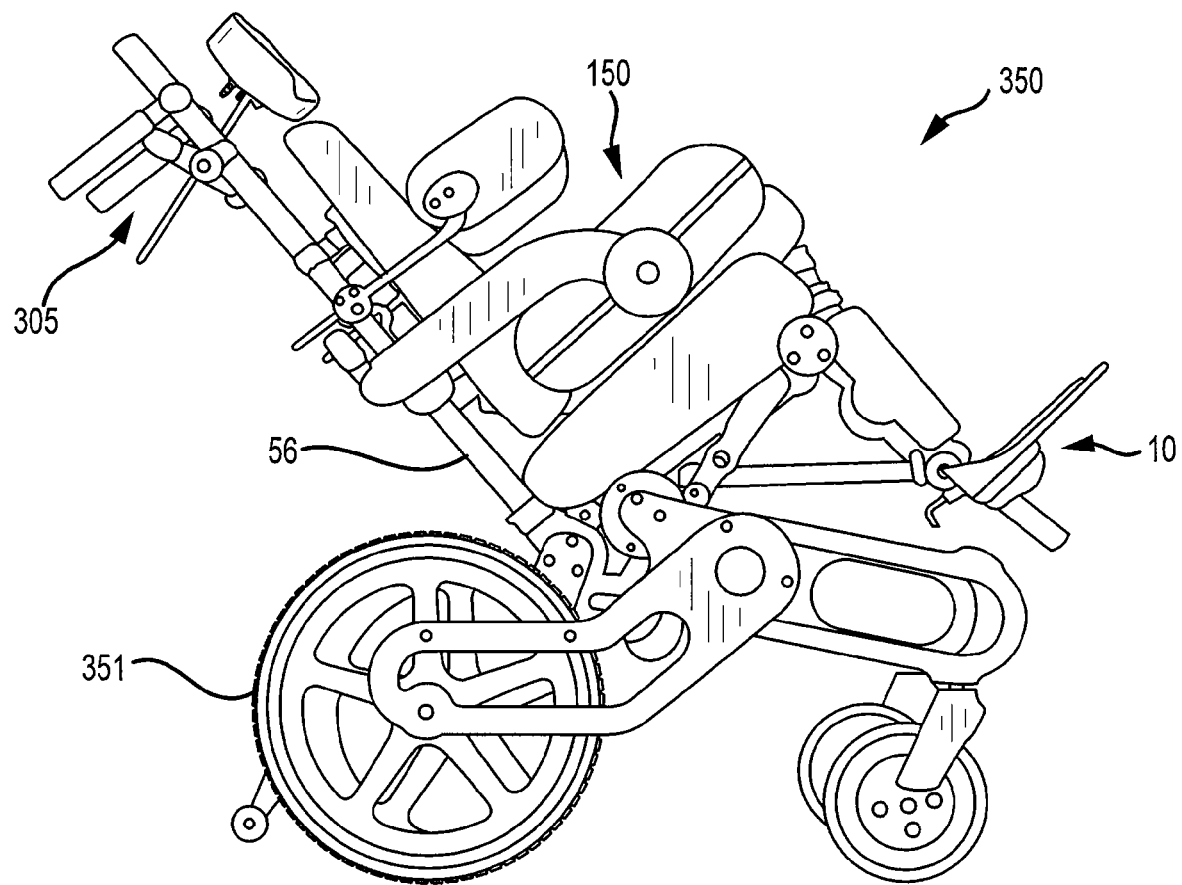
FIG. 7 is a side view of a wheelchair showing the typical locations of the various rests of FIGS. 1 to 6.

FIG. 7 is a side view of a wheelchair 350 having wheels 351 and a frame or chassis 56 and indicating the location of the various foot, thigh and head rest assemblies 10, 150, 305 of FIGS. 1 to 6.

The invention claimed is:

1. A Wheelchair comprising a chassis, a rest and an apparatus connecting the rest to the chassis, the apparatus comprising:
    a body attached to one of the chassis and the rest and having a concave surface and a corresponding convex surface;
    a clamp attached to the other of the chassis and the rest and having a first jaw and a second jaw moveable relative to the first jaw, the first and second jaws being configured to engage respectively the concave and convex surfaces of the body when applying a clamping force thereto,
    wherein at least one of said first and second jaws comprises at least one tooth configured to bite into the body as the clamping force is applied, thereby resisting movement between the rest and the chassis.

2. Wheelchair according to claim 1, wherein the concave and convex surfaces each have a substantially constant radius of curvature.

3. Wheelchair according to claim 2, wherein the concave and convex surfaces are each partially spherical.

4. Wheelchair according to claim 3, wherein the clamp further comprises a rod coupling the first and second jaws together, the rod extending through an aperture in the body.

5. Wheelchair according to claim 4, wherein the rod has a thread engageable with a corresponding thread in at least one jaw.

6. Wheelchair according to claim 1, wherein the first jaw is disc-shaped.

7. Wheelchair according to claim 1, wherein the second jaw is annular.

8. Wheelchair according to claim 1, wherein the at least one tooth is located on the periphery of said first and/or second jaw.

9. Wheelchair according to claim 1, wherein the rest is selected from the group comprising a footrest, thigh lateral support and a headrest.

10. Wheelchair according to claim 1, wherein the rest and apparatus are configured to be relatively translatable in at least one linear direction.

11. Wheelchair according to claim 10, wherein one of the rest and apparatus comprises at least one slot, the other of the rest and apparatus comprising a respective fastener engaging said slot.

12. Wheelchair according to claim 1, wherein said clamp is integrally formed with a bracket for attachment to the chassis.

13. Wheelchair according to claim 1, wherein the first and second jaws are made of a much harder grade of plastic than the concave and convex surfaces of the body.

* * * * *